(No Model.)
B. G. LOWREY.
WAGON LOCK.
No. 451,861. Patented May 5, 1891.
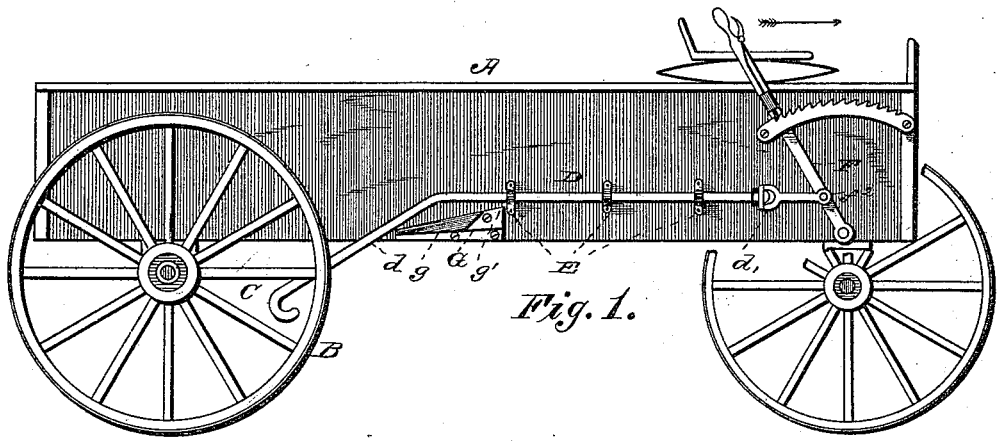
Fig. 1.
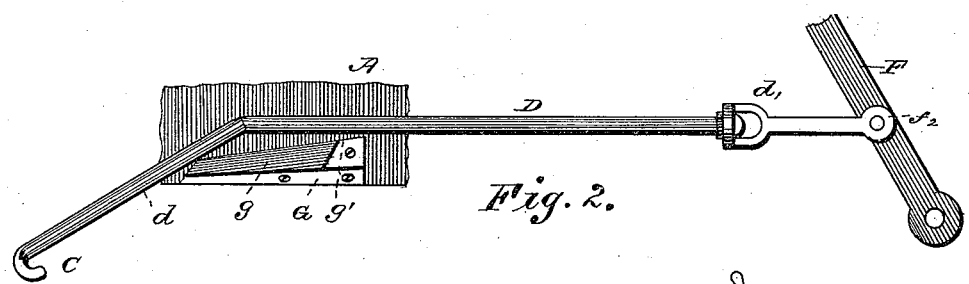
Fig. 2.
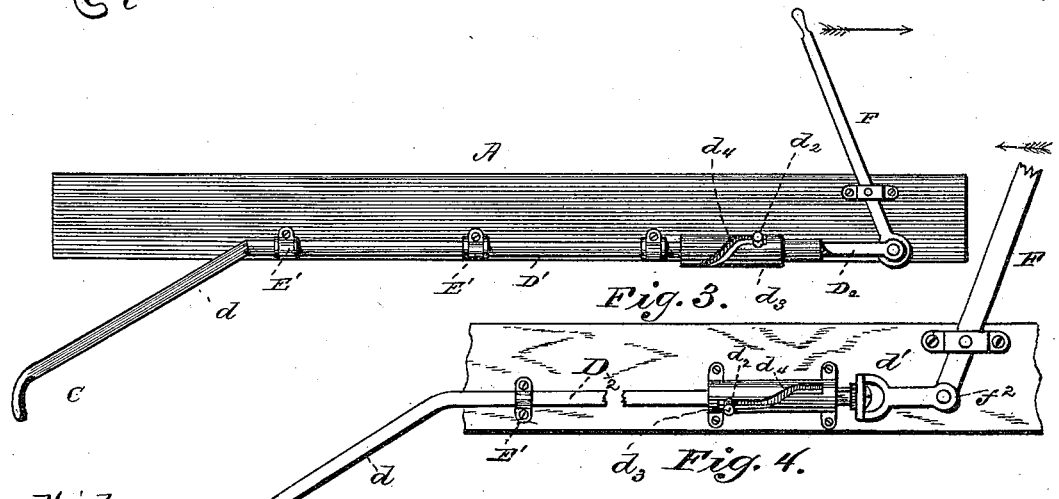
Fig. 3.
Fig. 4.
Witnesses
N. B. Harris
J. G. Wilson
Inventor
Bill G. Lowrey
By Whitman & Wilkinson
Attorneys

UNITED STATES PATENT OFFICE.

BILL G. LOWREY, OF BLUE MOUNTAIN, MISSISSIPPI.

WAGON-LOCK.

SPECIFICATION forming part of Letters Patent No. 451,861, dated May 5, 1891.

Application filed February 18, 1891. Serial No. 381,857. (No model.)

*To all whom it may concern:*

Be it known that I, BILL G. LOWREY, a citizen of the United States, residing at Blue Mountain, in the county of Tippah and State of Mississippi, have invented certain new and useful Improvements in Wagon-Locks; and I do hereby declare the following to be a full, clear, and exact description of the invention, such as will enable others skilled in the art to which it appertains to make and use the same.

My invention relates to wagon-locks for use in locking the wheels of a wagon in going downhill.

My device consists of a bent bar having a hook at one end, said hook normally hanging clear of the wheels beneath the wagon-body; but by turning the said hook out, so that it engages the fellies of the wheel, the said wheel becomes securely locked. Various devices may be adopted for turning the hook from under the body of the wagon and causing it to engage the wheel. In the drawings hereunto annexed I have shown two such devices.

Figure 1 represents a profile view of a wagon-body, showing one form of my device in which an inclined plane or wedge is used to give the requisite lateral motion to the hook. Fig. 2 represents an enlarged view of the locking device shown in Fig. 1. Figs. 3 and 4 represent other forms of my device wherein a stud and spiral groove give the desired turning effect to the hook.

The same parts are indicated by the same letters.

A represents the wagon-body.

B represents the hind wheels; B', the front wheels.

C represents the locking-hook.

D represents the bar having bent arm $d$.

In Figs. 1 and 2 the bar D is in two sections, secured together by a swivel $d'$. Said bar slides longitudinally in the guides E, while the swivel $d'$ allows the angular motion of the bar and hook. The end of the bar farthest from the hook is pivoted to the lever F at $f^2$. The said lever has a fulcrum near the front axle.

Firmly attached to the side of the wagon-body I have a block G with sloping face $g$ and flat top $g'$. The face $g$ slopes downward both toward the rear and toward the side of the wagon.

The hook C is shown hanging beneath the wagon-body. By pulling up on the lever F in the direction shown by the arrow the rod D is slid along through the guides E until the lower edge of the bent arm $d$ strikes the sloping face $g$, which throws the hook C out until it catches in the fellies on the wheel B'.

In Fig. 3 the rod D' has no longitudinal play, but is free to turn in the bearings E'. On its forward end it has a sleeve $d^3$ with screw-slot $d^4$. The other section of the rod D² has its rear end fitting loosely in the sleeve $d^3$, and has a stud $d^2$ engaging in the slot $d^4$. By pushing forward on the lever F, as indicated by the arrow, the stud is forced back in the slot $d^4$ and the rod D' is turned, throwing the hook C out, as in Fig. 1.

Fig. 4 represents another modification of my device, wherein the screw-thread $d^4$ is cut in a loose collar secured to the wagon-body and forming one of the guides. This screw-thread has a horizontal slot at the two ends to give the necessary longitudinal play to the rod D², so that the hook may be moved forward to catch the fellies of the wheel or backward to release the same, and so prevent the said hook from catching on the spokes of the wheel.

Having thus described my invention, what I claim, and desire to secure by Letters Patent of the United States, is—

1. In a wagon-lock, the combination of a bar in two sections, both capable of moving longitudinally, the first section being pivoted to a hand-lever, but held against rotation, the second being attached to the first with a swivel-joint and being held in guides and capable of rotation, the rear end of said bar being bent at an angle and terminating in a hook, with any suitable device for transmitting the direct motion of the hand-lever into the rotary motion of the rear section of the bar, substantially as described.

2. In a wagon-lock, the combination of a bar in two sections, the first section being pivoted to a hand-lever and free to move longitudinally, but held against rotation, the second section being attached to the first with a swivel-joint and sliding longitudinally in guides and being capable of rotation, the rear end of said bar being bent at an angle and terminating in a hook, with an inclined plane sloping outward and to the rear secured to the wagon-body, said inclined plane engaging the bent section of the bar, substantially as described.

3. In a wagon-lock, the combination of the hand-lever F with the bar D, in two sections joined together with a swivel-joint, the front section being pivoted to the said lever and the rear section being bent into the arm $d$, and the hook C, with the guides E secured to the wagon-body, and the block G, also secured to the wagon-body and having the inclined face $g$, substantially as described.

In testimony whereof I affix my signature in presence of two witnesses.

BILL G. LOWREY.

Witnesses:
W. E. BERRY,
N. S. WATSON.